United States Patent [19]

Shreve

[11] 4,304,473

[45] Dec. 8, 1981

[54] AUTOMATED EXPOSURE-CONTRAST CONTROL INDEX METER

[76] Inventor: James S. Shreve, 10027 Black Ct., Fairfax, Va. 22032

[21] Appl. No.: 52,300

[22] Filed: Jun. 26, 1979

[51] Int. Cl.³ .......................... G03B 7/093; G01J 1/44
[52] U.S. Cl. .................................... 354/23 R; 354/41; 354/50; 354/58; 356/221
[58] Field of Search .................. 354/23 R, 28, 29, 58, 354/41, 43, 37, 38, 48, 50, 67, 65; 355/83, 84; 356/219, 221, 224; 250/578

[56] References Cited

U.S. PATENT DOCUMENTS 4,159,168  6/1979  Sumi ...................................... 354/58

OTHER PUBLICATIONS

Automatic Exposure Control, Bruck & Ward, Photographic Engineering, vol. 3, No. 1, 1952 pp. 1-11.

Primary Examiner—L. T. Hix
Assistant Examiner—Stafford D. Schreyer
Attorney, Agent, or Firm—Nathan Edelberg; Robert P. Gibson; Saul Elbaum

[57] ABSTRACT

An apparatus and method for determining a film development parameter and a camera exposure setting to compensate for the luminous dynamic range of a subject being photographed. In a semi-automatic embodiment, information corresponding to desired film densities for two areas of the subject matter is manually inputted to the apparatus, which is then pointed towards the two areas. In an automatic embodiment, information corresponding to desired film densities for the brightest and least bright areas of the subject to be photographed is manually inputted, the entire subject is automatically scanned by a vidicon or equivalent means, and the brightest and least bright areas of the subject are automatically detected.

15 Claims, 8 Drawing Figures

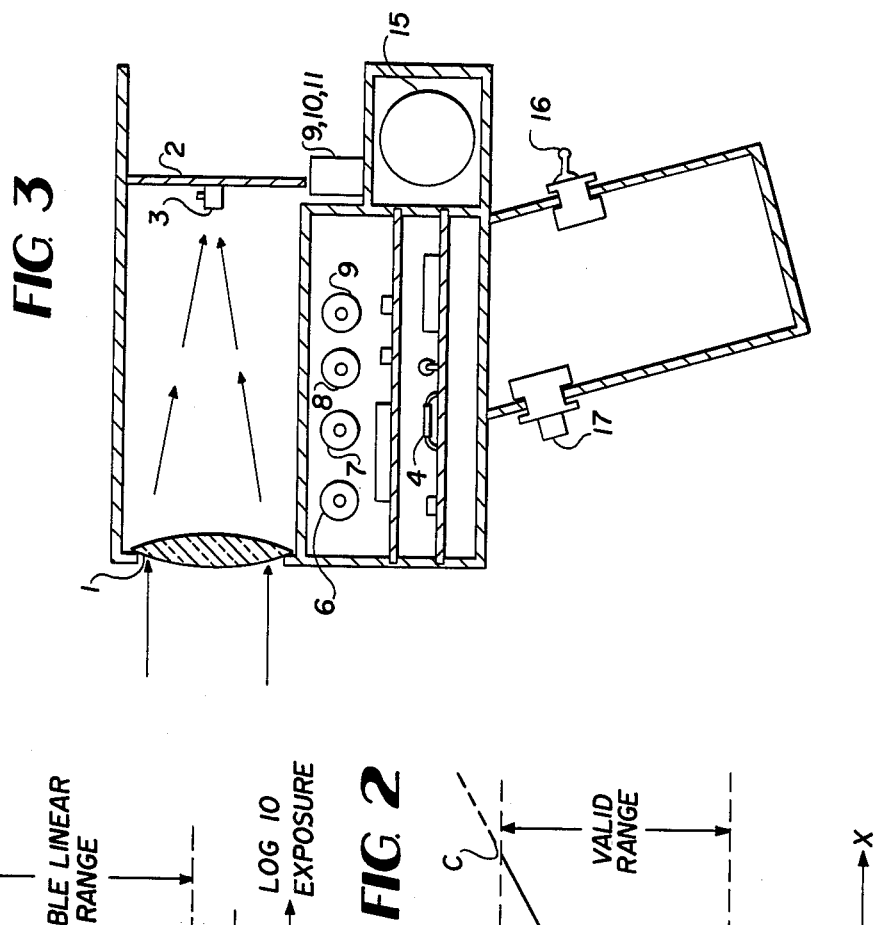

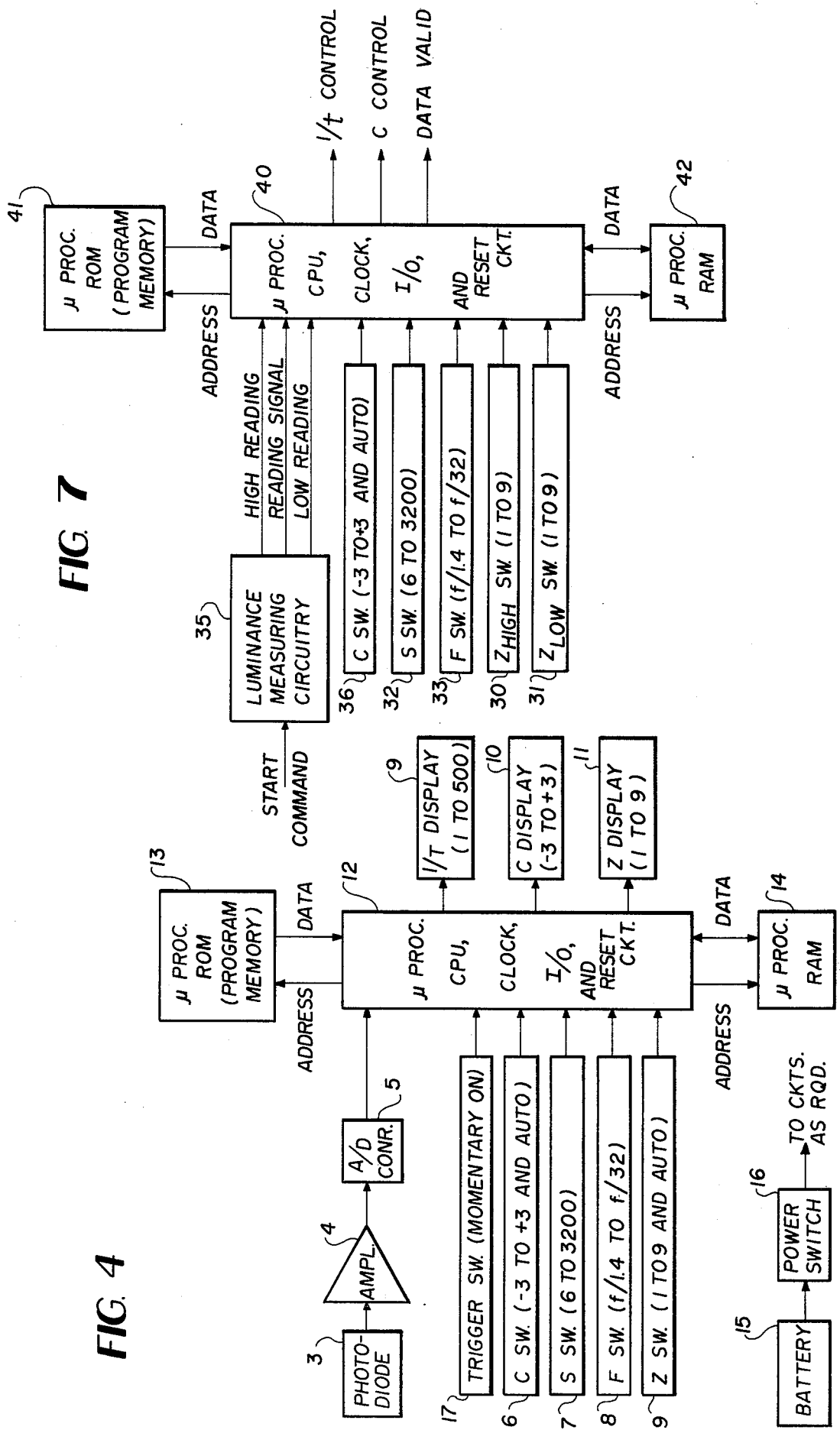

AUTOMATED EXPOSURE-CONTRAST CONTROL INDEX METER

RIGHTS OF THE GOVERNMENT

The invention described herein may be manufactured, used, and licensed by or for the U.S. Government for governmental purposes without the payment to me of any royalty thereon.

The present invention pertains to the measurement of luminous intensity and intensity dynamic range for photographic purposes, and provides an apparatus which determines both a film development parameter and a camera exposure setting to compensate for the dynamic range of the subject being photographed. By employing the device disclosed, higher quality photographic recordings can be made than is usually the case. While such quality is particularly beneficial in the military applications of automatic aerial photography, hand-held aerial photography, and surface reconnaissance photography, commercial photography, and photographs made by hobbyists would also benefit.

In photographic recording of all types the usual approach neglects to systematically compensate for the luminous range of the subject material. It is possible, however, to match, or for that matter to deliberately mismatch in a controlled manner, the film dynamic range to subject luminous range by adjusting the film development parameters. The device disclosed takes the appropriate data and performs the necessary calculations to specify these parameters as well as the proper camera settings. It accomplishes the same result automatically that a few photographers have been obtaining by manually practicing what is known as the "Zone System".

The disadvantage of the Zone System, which was formalized by Ansel Adams primarily to produce esthetically pleasing photographs, is that it entails time-consuming measurements and mental calculations at the time that the exposure is made. While mechanical calculators have been developed to ease the task, they still require manual data entry by the operator. Because the Zone System is relatively slow and awkward in implementation it has not been widely adopted by photographers, and has not been considered to be suitable for most military applications.

It is thus an object of the invention to provide an improved apparatus and method for compensating for luminous dynamic range in making photographic records.

It is a further object of the invention to provide an apparatus which determines parameters for effecting such compensation without the need for making time-consuming measurements and/or calculations at the time that the photograph is taken.

It is still a further object of the invention to provide an apparatus which determines such parameters either automatically or semi-automatically.

It is still a further object of the invention to provide an apparatus which automatically or semi-automatically determines both a film development parameter and a camera exposure setting for compensating for luminous dynamic range.

To accomplish the above objects an apparatus comprised of a photosensitive means, manual data entry switches, and a processor, is provided. Luminous intensity readings are taken by the photosensitive device and operated upon by the processor to produce the desired output—namely the required exposure "E", and the contrast control index "C" which specifies the deviation from normal film development. There are two modes of operation which may be obtained by two embodiments of the device, or by a single multi-purpose implementation if desired. In the "semi-automatic" mode, the operator treats the device like a spot exposure meter in that he aims it at specific areas of interest within the camera field of view. In the "automatic" mode the entire field of view is automatically scanned by the device. The latter would be required for applications such as automatic aerial photography.

In the semi-automatic mode the operator selects two subject areas and assigns to them numbers which represent the desired effect that their luminance will have on the film. In technical terms he is specifying particular film densities; in terms of the Zone System he is specifying density zone numbers; and in popular terms he is specifying "deep shadow", "highlight", etc. The numbers are assigned by a data entry switch, which is set just prior to pointing the device at each significant area.

In the automatic mode the device automatically selects the extremes of the luminance readings obtained by scanning the subject and automatically assigns to them pre-selected numbers, which correspond to the operator-selected numbers above.

While the manual mode provides a visual readout, and has provision for cross checking with additional readings on other subject areas, the automatic mode provides control signals to the camera or camera complex directly. Of course a visual readout may be provided in any case if desired.

The invention will be better understood by referring to the following drawings in which:

FIG. 1 is a graph which depicts characteristic curves for a specific film type.

FIG. 2 is a graph of a linear film response model based on the characteristic curves of FIG. 1.

FIG. 3 is a pictorial illustration in cross-section of a possible physical configuration for the semi-automatic embodiment of the invention.

FIG. 4 is an electronic block diagram of the circuitry of the semi-automatic embodiment of the invention.

FIG. 7 is a block diagram of the general circuitry of the fully automatic embodiment of the invention.

Figure 5:
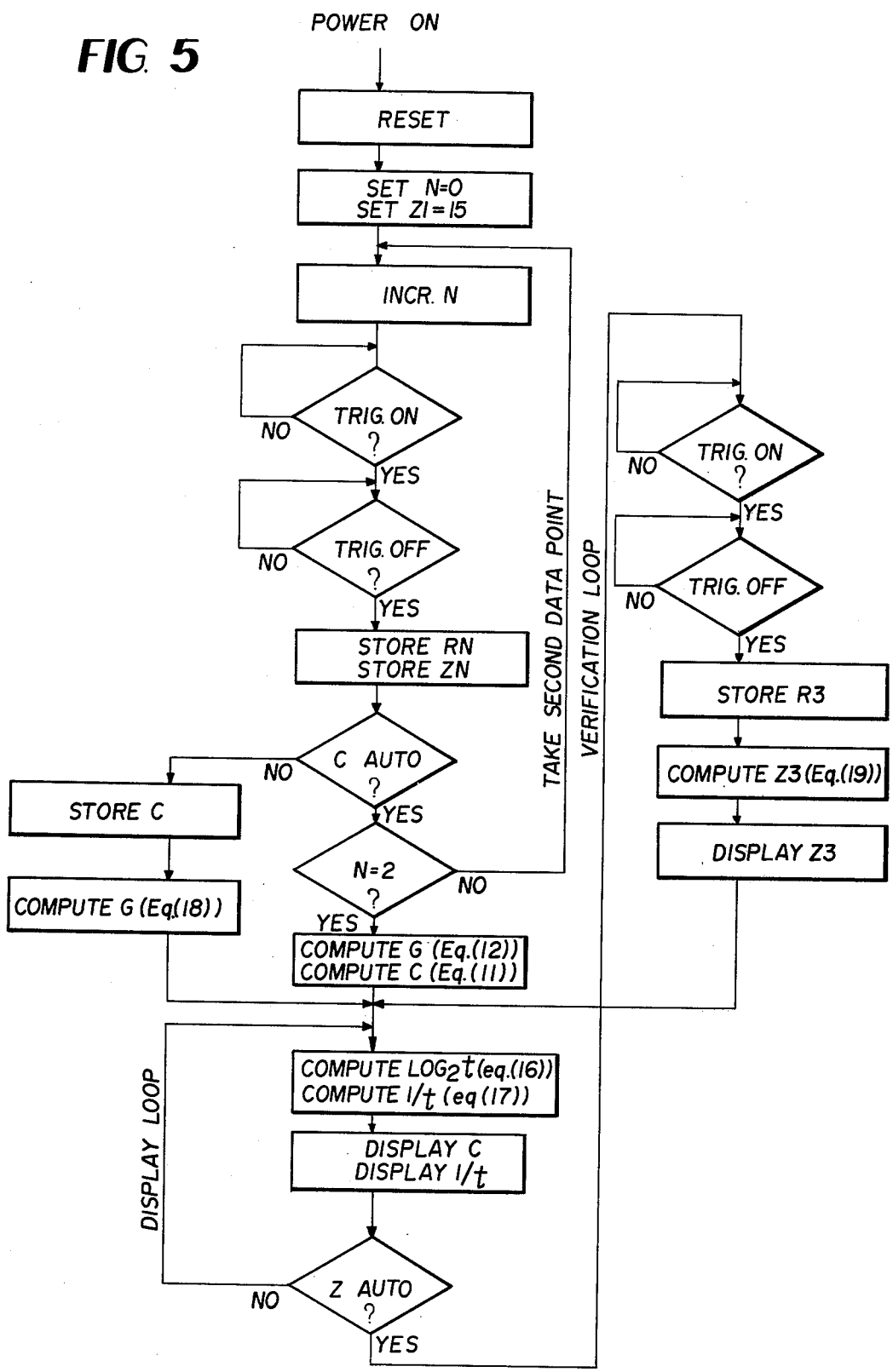
FIG. 5 is a flow chart for the microprocessor program utilized by the semi-automatic embodiment of the invention.

To simplify the explanation of the invention, the remainder of the specification is broken down into sections as follows:

1. MATHEMATICAL DESCRIPTION
    1.1 The Zone System
    1.2 The Parameter Z
    1.3 Characteristic Curves
    1.4 Sensitivity
    1.5 Equations for Solution
2. THE SEMI-AUTOMATIC EMBODIMENT
    2.1 Overall Configuration
    2.2 Microprocessor Program
    2.3 Operation 3. THE AUTOMATIC EMBODIMENT
  3.1 Overall Configuration
  3.2 Microprocessor Program
  3.3 Operation

1. MATHEMATICAL DESCRIPTION

1.1 The Zone System

An attempt is made here to formalize and refine the manipulations associated with the Zone System into algebraic equations and then into computational algorithms, so that the benefits of the Zone System may be obtained with the apparatus of the invention.

The first task is to define terms in a concise manner. The word "zone" itself has been used to mean different things in different contexts, and therefore its use will be dropped from the mathematical expressions that will utlimately govern the microprocessor used in the apparatus. It will be useful, however, in describing new terms, especially to those familiar with the Zone System.

At least sometimes, "zone" has referred to luminance. The luminance zone value (written I, II, III, IV, etc.) is relative. Usually a zone III subject area has meant an area that is the darkest in which the operator wishes to preserve detail, detail meaning small local fluctuations in luminance about the area average. Each succeeding zone (next higher integer) represents twice the luminance of the preceeding one. Under what has come to be called "average" conditions, a standard 18%—reflectance gray card falls into zone V, and the brightest area in which detail is to be preserved falls into zone VIII. Thus, under average conditions, the range of luminance to be faithfully recorded is about 5 zone numbers, or a ratio of 32:1.

Most photographic films, when given standard or "normal" development, accommodate this luminance range if correctly exposed. When non-average subjects are to be recorded, the range of luminance to be accommodated may be more or less, thereby causing a degradation in the photographic record unless some compensation is introduced. If the luminance range greatly exceeds 32:1, the denser portions of the negative suffer from graininess, unsharpness, and difficulties in printing; if the luminous range is much less than 32:1, the problem is similar to a poor "signal-to-noise" ratio—i.e., random or other unwanted variations contribute excessively to the final photographic record.

Fortunately, non-normal film development can change the luminance range accommodated by the film, and within limits can reduce or eliminate the above degradations. In the classic Zone System, the number of luminance zones to be accommodated is determined with the aid of a "spot" or narrow field of view exposure meter. The difference between the range of zone numbers and the number five is an indication of the extent to which normal film development must be modified.

Typically, the camera exposure settings are then based on the luminance measured at the dark end of the scale, i.e. a zone II luminance, with perhaps some estimated correction added. With no correction, this means of determining exposure settings is quite rough, since it erroneously presumes that the light energy required to produce a record at this end of the film's dynamic range is independent of film development. This is not a good approximation as we shall see. The method adopted in the automated implementation of the present invention makes use of both readings to extrapolate to a zone outside of the usable range where the light energy requirement is more nearly independent of development.

1.2 The Parameter Z

We will now introduce a parameter "Z" which will be defined in terms of film density. The following observation is more illuminating than the definition is, however. That is, under normal exposure and development, each subject area within the normal luminance range produces a value of Z which equals the luminance zone number. In effect it is a "density" zone number, although it is not limited to integral values as zone numbers classically have been.

We shall actually define Z by $$Z = 1.1 + (6 \times D) \tag{1}$$

where D is the film density. A Z of 5.0 implies a density of 0.65, which is considered appropriate for a normal zone V luminance. A Z of 3.0 implies a density of 0.32, and a Z of 8.0 implies a density of 1.15; these are approximately the extremes of densities in the linear region of most films. A Z of less than 1.1 implies a negaive density, a phenomenon not encountered in film, but nevertheless a useful mathematical concept.

We can now describe the Zone System as one wherein given luminances are assigned, or caused to produce, desired values of Z. Under normal conditions a zone III luminance is assigned a Z of 3, a zone VIII luminance is assigned a Z of 8, and so on. For a subject having a greater range (to be linearly recorded), a zone IX or zone X luminance might be assigned a Z of 8. Thus Z describes an effect, while luminance zone describes a cause.

The letter Z was chosen for this parameter because of its relationship to the word zone. Those using the Zone System in the past are on familiar terms with phrases like "placing a subject area in zone VII", which means something to the photographer but perhaps not to the mathematician. It is hoped that a similar phrase like "causing a given subject area to produce a Z of 7" will satisfy the photographer, mathematician, and the microprocessor.

1.3 Characteristic Curves

Light-sensitive films and papers are usually described by "characteristic curves" which plot resulting density as a function of the logarithm (base 10) of exposure, exposure being the incident energy per unit area. A family of curves is associated with each film type, one curve for each of several developing variations. Published data usually show one curve for each of several development times, although other parameters can be varied instead. FIG. 1 shows a typical family of characteristic curves for one film type. For light-sensitive papers the development is usually kept fixed, while the exact composition of the sensitized layer is varied. Thus each paper type is manifest as several distinct products, each classified by a "contrast number".

The data of FIG. 2 approximates that of FIG. 1 within the linear region; it illustrates the mathematical model which we will employ to describe film response. In FIG. 2, densities are given as values of Z, and the base-10 logarithmic exposure values are replaced by base-2 logarithmic values, denoted by X. That is, $$X = \log_2 q. \tag{2}$$

where q is the total light energy per unit area incident upon the sensitized surface.

Our previous definition and observations about Z are now seen to relate to characteristic-curve slope for normal development. With normal development, a luminance ratio of 32:1, which represents 5 zones and which implies a range of 5 for X, will produce a corresponding domain of 5 for Z; thus the slope of the Z-X curve for normal development is unity. The same domain in terms of D, and range in terms of logarithm (base 10) of exposure, give a slope of 0.55, which is nearly identical to the generally accepted 0.56 for normal development.

Even with modified development, the linear region of the characteristic curve generally extends over a density range of about 0.83, or a range of 5.0 for Z. By changing the slope of the curve, however, the linear region encompasses a greater or smaller exposure ratio. By this mechanism the exposure ratio for the linear region can be matched to the luminance ratio of the subject areas of interest. Then by choosing the proper camera lens opening and shutter speed, the image projected on the film will exhibit the exposure values called for in the film's linear region.

1.4 Sensitivity

By definition, ASA film speed, $S_x$, is given by $$S_x = 0.80/q_m \quad (3)$$

where $q_m$ is the number of lumen seconds per square meter that will produce a density of 0.1 units above gross fog, given normal development.

This specified density is outside of the linear region of most, if not all films. However, it is generally assumed that 10 times $q_m$ will produce a density very near 0.65, which is definitely within the linear region. Noting that this density implies a Z of 5, we now define a speed S, which is approximately the same as $S_x$, to be $$S = 8.0/q_5 \quad (4)$$

where $q_5$ is the number of lumen seconds per square meter that will produce a density of 0.65, or a Z of 5.0. This is really the "effective speed" that some photographers find experimentally for each film type which they use, although effective speed may also reflect errors arising in individual pieces of equipment and errors in judging densities, as well as modifications representing personal taste.

By extrapolating our linear film response model for normal development, we find the general expression $$q_Z = 2^{Z-5} \times 8.0/S = 2^{Z-2}/S \quad (5)$$

where $q_Z$ is the energy density required to produce any given value of Z. In particular, equation (5) holds for the value $Z_0$ where all of the curves for various developments are assumed to intersect:

$$q_{Z_0} = 2^{Z_0-2}/S \quad (6)$$

If such a point exists, equation (6) applies to all curves of the family. Actual film data indicate that a linear film response model can be constructed which accurately describes the characteristic curves in the linear region, and which does exhibit a common intersection point. In fact, a single intersection point may be chosen which applies to many common film types.

Now subject luminance, as determined by a photoelectric device of one kind or another, is related to the energy density incident on the film by the following:

$$q = \pi/4 \; L/F^2 \; T \; t \quad (7)$$

where q is given in terms of lumen sec/m$^2$,
L is luminance in lumens/steradian m$^2$,
F is the lens "f number",
T is the lens transmittance, and
t is the shutter opening in seconds.

If, as is commonly the case, luminance is obtained as a meter reading R in candles per square foot, we have $$L = 10.8R, \text{ and} \quad (8)$$

$$q = 8.5 \; R \; t \; T/F^2 \quad (9)$$

It is interesting to note that equations (5) and (9) show that normally-developed film will produce a Z of 5.0 if the camera is set with $F = \sqrt{R}$ and $t = 1/S$, assuming the usual but optimistic T of 94%.

1.5 Equations for Solution

We have now developed the relationships necessary to solve for slope G, and camera setting t given F (or vice versa), given two luminance readings and the two values of Z they are to produce. G is defined as $$G = \Delta Z/\Delta X \quad (10)$$

By definition of Z, a unity G results from normal development. A G of 5/6 expands the luminous range covered in the linear region by a factor of two, or one "zone", while a G of 5/4 changes the range covered by a factor of one-half, or minus one zone. Those practicing the Zone System would denote the development that produces a G of 5/4 as "N+1", meaning that a zone VII luminance now has the effect of one higher zone compared to normal. In keeping with this, we introduce a contrast control index "C". We define C as $$C = 5 - 5/G \quad (11)$$

and thus in the example given C is the "+1" in "N+1". Positive C requires development times longer than normal, which of course results in the desired "more contrasty" negatives, while negative C requires shorter development times with the resulting "softer" negatives.

Now given readings $R_1$ and $R_2$, and corresponding desired Z values of $Z_1$ and $Z_2$ (assumed to lie in the linear region of about 3 and 8), we find $$G = (Z_2 - Z_1)/(\log_2 R_2 - \log_2 R_1), \text{ and} \quad (12)$$

$$C = 5 - (5/Z_2 - Z_1)) \; (\log_2 R_2 - \log_2 R_1) \quad (13)$$

We note that a fictitious reading $R_0$, which would produce $Z_0$ if the linear region extended that far, can be found by replacing $R_2$ with $R_0$ and $Z_2$ with $Z_0$ in equation (12):

$$\log_2 R_0 = \log_2 R_1 + (Z_0 - Z_1)/G \quad (14)$$

From equations (6), (9), and (14) we find $-\log_2 t = \log_2 (34 \times T) - 2\log_2 F + \log_2 R_1 + \log_2 S + (Z_0 - Z_1)/G - Z_0$ (15)

As is the standard practice in exposure meter design, we replace T with 0.94, which yields: $-\log_2 t = 5 - 2\log_2 F + \log_2 R_1 + \log_2 S + (Z_0 - Z_1)/G - Z_0$ (16)

Of course $$1/t = 2^{-\log_2 t} \quad (17)$$

Equations (11), (12), (16) and (17) are the calculations that must be made by the microprocessor. The solution to equation (11) can be rounded off to the nearest integer with little degradation in performance. The same is true of equation (17), especially since most shutters are only calibrated at points which are integral powers of ½, in seconds.

The inverse of equation (11)

$$G = 5/(5 - C) \quad (18)$$

is also useful in a secondary role as is $$Z_3 = Z_1 + (\log_2 R_3 - \log_2 R_1)G \quad (19)$$

which is similar to equation (12) but which is applied to a third confirming data point.

2. THE SEMI-AUTOMATIC EMBODIMENT

2.1 Overall Configuration

The semi-automatic embodiment is comprised of a luminance measuring device, an A/D converter, switches for entering data, a microprocessor, a display, and a power source. As illustrated in FIG. 3, a typical luminance measuring device for this application consists of a lens 1 which focuses the image of the subject upon a translucent sighting screen 2, a photodiode 3 located near the center of the focusing screen facing the lens, and a suitable electronic amplifier 4 driven by the photodiode. Thus the luminance of the image falling on the photodiode, which is a small portion or "spot" near the center of the viewed image, is converted to a corresponding electrical signal.

The A/D converter 5 shown in FIG. 4, is connected to the output of the amplifier in the luminance measuring device, and provides a digital output which is proportional to the measured luminance. Since the luminance must be put in logarithmic form (see equation (16)), the A/D converter might be designed to do this directly. Instead, the microprocessor itself might perform the A/D conversion with the aid of a few analog parts such as a D/A converter and a comparator, and could obtain the logarithmic form directly. As known by those skilled in the art, there are many other means for performing this conversion, including non-linear analog circuits and digital look-up memories.

The data switches 6,7,8, and 9 and LED readouts 9,10, and 11 and their ranges shown in FIG. 4 are only typical. A switch for "development control index C" is not really required; its inclusion, along with the appropriate microprocessor programming, adds versatility to the device as is explained below. These same remarks apply to the "AUTO" setting on the switch for "Z", and the display for "Z".

In the primary mode of operation the switch for C is set to AUTO, as C is one parameter to be computed. The value for Z is then entered for each of two luminance readings. if the switch for C is set to a specific value, then only one value of Z is entered and only one reading is required, as only exposure is to be computed.

Once the exposure calculations have been made, the switch for Z may be set to AUTO, and the Z value will be displayed for each new reading taken as a check for the operator.

The microcomputer is comprised of microprocessor 12 which includes the CPU, clock, input/output and reset circuitry; read only memory 13 which stores the program; and random access memory 14 for temporary storage of data.

2.2 Microprocessor Program

A typical program, which will perform the operations described above, is presented in flow-chart form in FIG. 5. Specific programming for the computations defined in the individual blocks is a routine programming task, within the skill of one in the art.

2.3 Operation

With the preceding program the operator has a choice of either taking two luminance readings and specifying a value of Z for each, which is the primary mode of operation, or taking one reading and specifying one value of Z as well as specifying a value for C. For the primary mode the C switch is set to AUTO; otherwise a development control index is entered. It should be noted that zero is normal development, unity is a "pushed" development sometimes referred to as "N+1 development", and so on. If zero is entered and the Z switch is set to the commonly-used gray-card approximation of 5, the meter behaves identically to a conventional spot exposure meter.

In any case the operator selects the one or two critical subject areas to measure, and decides on their desired effects in terms of Z values. Recall that a Z of 3 applies to the darkest area that will exhibit detail, while a Z of 8 applies to the lightest area that will exhibit detail.

As the embodiment is described here, the mechanics of its operation proceed as follows. The power switch 16 is turned on and the switches for C, film speed, and lens opening are set to the desired values. The value for Z for the first subject area is then entered, the meter is aimed so that the image of that area falls on the photodiode, and the trigger switch 17 is activated. If two areas are to be measured, the second value for Z is entered, the meter is re-aimed toward the second subject area, and the trigger 17 switch is again activated.

The display will now exhibit the computed values of 1/t and C. Changing the film speed or lens opening entries will cause the 1/t display to change accordingly.

At this point the operator may verify the applicability of the exposure solution obtained by investigating the resultant effects on additional subject areas. This is done by setting the Z switch to AUTO, aiming the meter to any desired subject area, and activating the trigger. The corresponding value of Z will then be displayed. Any number of such measurements may be made; each time the value of Z will be displayed after the trigger has been activated. If the operator is dissatisfied with these results, he has the option of starting all over (by interrupting the power momentarily, which resets the microprocessor as it is described here), or of introducing a compromise by specifying a value of C somewhat different from the previously computed value (accomplished by interrupting the power to reset the microprocessor, entering the value for C, then taking a reading on one critical subject area with an appropriate Z entry). Of course any new exposure solution can be verified as before.

3. THE FULLY-AUTOMATIC EMBODIMENT

3.1 Overall Configuration

The fully-automatic embodiment is comprised of a luminance measuring device, A/D converters, switches for entering data, a microprocessor, output control lines, and a power source. A typical luminance measuring device for fully-automatic operation incorporates a photodiode-array camera or a vidicon camera, with the same field of view as the camera which the meter is intended to control. Preferably the luminance-measuring camera would be affixed to the other camera and bore-sighted to it.

Figure 6:
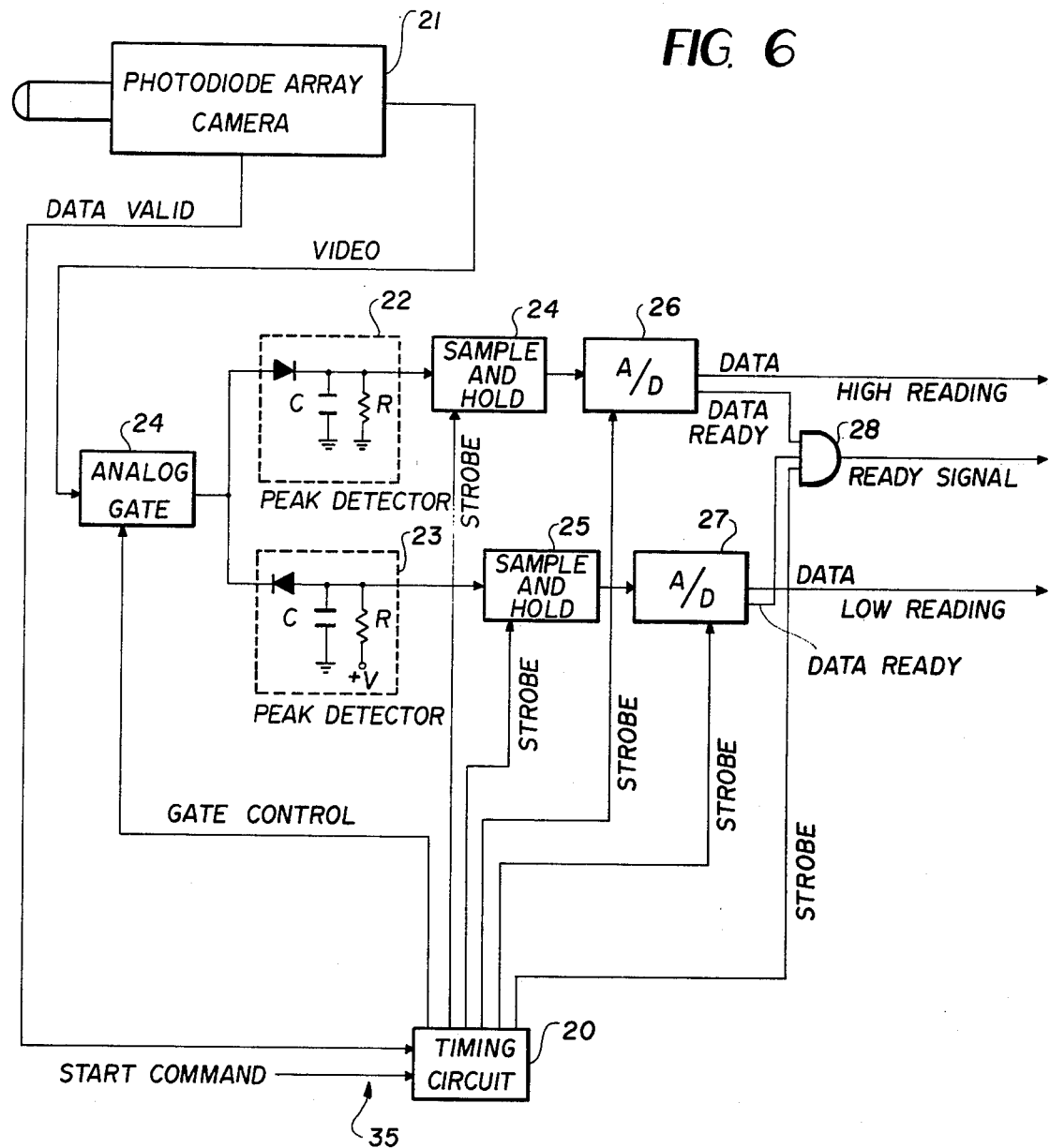
FIG. 6 is a block diagram of exemplary luminance-measuring circuitry utilized by the fully automatic embodiment of the invention.

The lowest and highest luminance values are determined by detecting the lowest and highest signal levels coming from the luminance-measuring camera. Exemplary circuitry 35 for accomplishing this is shown in FIG. 6. The timing circuit 20 passes the video signals from the camera 21 to two peak-detecting circuits 22 and 23 by means of analog gate 24. The peak-detecting circuits have reversed diodes and opposite restoring polarities, so that one circuit responds to the highest video amplitude while the other circuit responds to the lowest video amplitude. The circuit is arranged so that when video is not present the analog gate is in its floating state.

After one or more frames of video have been processed, the sample-and-hold circuits 24 and 25 are activated to acquire the highest and lowest readings from the peak detectors. This is quickly followed by an A/D conversion command. When both A/D converters 26 and 27 signal that they have digitized the readings, the AND gate 28 sends a "Ready" signal to the microprocessor, which then accepts the readings.

FIG. 7 shows the overall configuration in block form. It should be appreciated that many variations are possible and that the configuration illustrated here is patterned after the semi-automatic embodiment. The microcomputer is comprised of units 40, 41, and 42, and is as described in conjunction with FIG. 4. The output lines typically go directly to the camera being controlled, while the "start" command comes from whatever controls the times at which exposures are desired. The "Data Valid" output is a microprocessor-controlled level which remains true for a short time after each set of computations have been made, and serves to disable the controlled camera when the computations are no longer current.

3.2 Microprocessor Program

Figure 8:
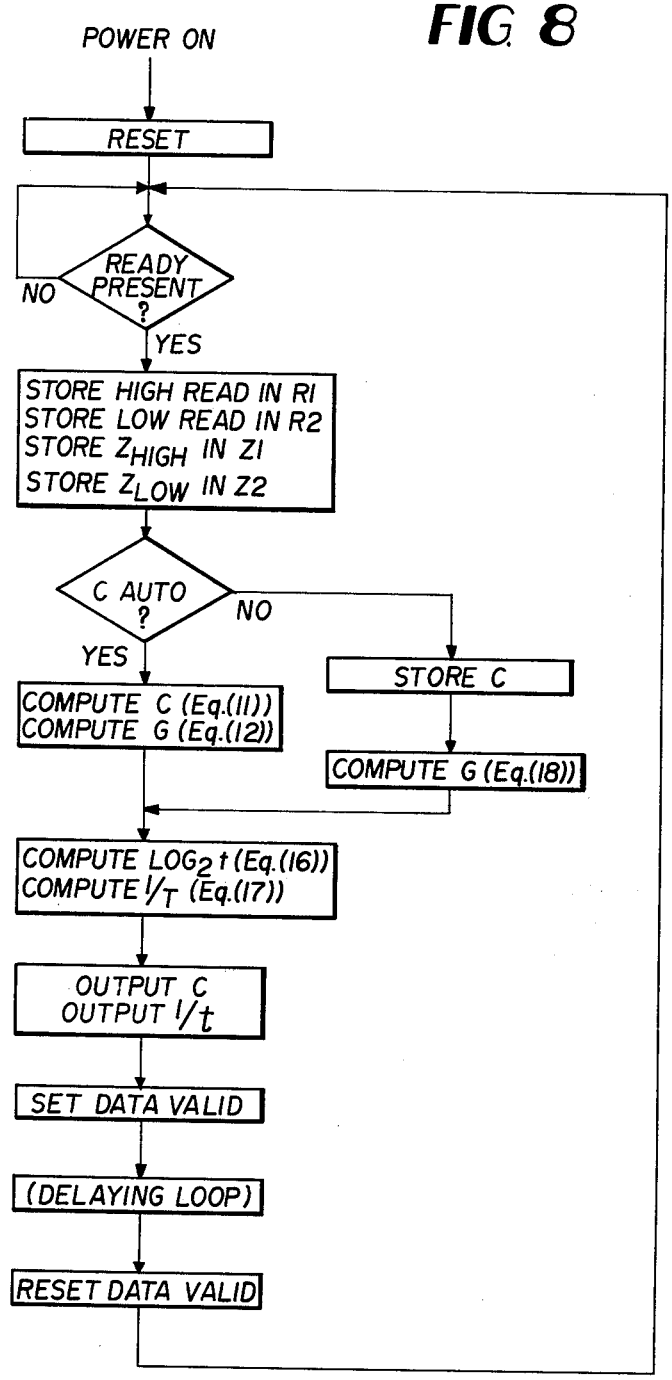
FIG. 8 is a flow chart for the microprocessor program utilized by the fully automatic embodiment of the invention.

A typical program is presented in flow chart form in FIG. 8.

3.3 Operation

The fully-automatic meter is affixed to the camera-carrying vehicle or to the controlled camera itself, and is bore-sighted to the controlled camera. The field of view of the meter is adjusted to coincide with that of the controlled camera by adjusting the focal length of the lens incorporated in the luminance-measuring camera.

Prior to operation, values of Z for the lightest and darkest subject areas are entered into the meter with switches 30 and 31. Typically these will be 8 and 3 respectively, although experience may indicate better choices under certain conditions. Film speed is entered with switch 32, and in the exemplary configuration discussed here the lens opening is entered with switch 33, although lens opening could be a meter-controlled parameter instead of or in addition to shutter speed. As described here, during operation the meter sends electric signals to the controlled camera to control exposure by adjusting shutter speed.

Electric signals representing the value of C will either select one of several film magazines, each dedicated to a different specific value of C (and therefore developed differently); or will select one of a bank of cameras, again each dedicated to a different specific value of C; or will cause a record associated with the film to be made which indicates the proper development for each frame or section of film. A variation of the latter is to select one development for all film exposed based on the best accommodation to the various recorded values of C, e.g. the average value, or the minimum value.

I wish it to be understood that I do not desire to be limited to the exact details of construction shown and described, for obvious modifications can be made by a person skilled in the art.

I claim:

1. An apparatus for determining a film development parameter and camera exposure setting for each frame of film for subject matter to be photographed, comprising, means for sensing the luminous intensities of selected areas of said subject matter to be photographed and for providing first electrical signals which correspond to said sensed intensities, means for selecting desired film densities for each of said selected areas, means for providing second electrical signals indicative of said selected desired film densities which it is desired for said sensed luminous intensities to produce on said film, means responsive to said first and second electrical signals for deriving said film development parameter and said exposure setting and for providing an output signal indicative of said film development parameter and said exposure setting, means responsive to said output signal for controlling said camera exposure setting for said each frame of film, and means responsive to said output signal for causing subsequent development of said each frame of film to correspond to said derived film development parameter.

2. The apparatus of claim 1 wherein said film development parameter is the contrast control index.

3. The apparatus of claim 1 wherein said means responsive to said first and second electrical signals for deriving said film development parameter and said exposure setting comprises, means for determining a film development parameter which adjusts the dynamic range of said film to correspond to said sensed luminous intensities and said selected desired film densities, and means for determining said exposure setting for use with said film development parameter.

4. The apparatus of claim 3 wherein said means for determining a film development parameter comprises, means for determining a required dynamic range from said sensed luminous intensities and said selected densities, and means for calculating a film characteristic-curve slope.

5. The apparatus of claim 4 wherein said means for determining said exposure setting for use with said film development parameter comprises, means for interpreting said calculated film characteristic-curve slope, and means for calculating said exposure setting at substantially the center of said characteristic-curve.

6. The apparatus of claim 5 wherein said means responsive to said output signal for causing subsequent development of said each frame of film to correspond to said derived film development parameter comprises means for recording said film development parameter for each of said exposures whereby each of said exposures can be subsequently developed in accordance with said derived development parameter.

7. The apparatus of claim 5 wherein said means responsive to said output signal for causing subsequent development of said each frame of film to correspond to said derived film development parameter comprises means for selecting a film magazine which contains film to be developed in accordance with said derived film development parameter.

8. The apparatus of claim 5 wherein said means responsive to said output signal for causing development of said each frame of film to correspond to said derived film development parameter comprises means for selecting a camera which contains film to be developed in accordance with said derived film development parameter.

9. The apparatus of claim 5 wherein said means for selecting desired film densities for each of said selected areas comprises a manual data entry means for allowing operator selection of settings which correspond to said desired film densities.

10. The apparatus of claim 9 wherein said means for sensing the luminous intensities of selected areas and for providing first electrical signals includes photoresponsive means.

11. The apparatus of claim 10 wherein said photoresponsive means is a means for sensing only a small area of the subject matter to be photographed, and is also capable of being manually moved to different orientations to sense different areas.

12. The apparatus of claim 11 wherein said selected areas consist of two areas which are selected by an operator.

13. The apparatus of claim 10 wherein said photoresponsive means is a scanned means for sensing the entire extent of the subject matter to be photographed.

14. The apparatus of claim 13 wherein said selected areas are the brightest and least bright areas of the subject matter, further including means for automatically detecting said brightest and least bright areas.

15. The apparatus of claim 10 further including means for displaying said derived film development parameter and exposure setting.

* * * * *